United States Patent [19]

Noël et al.

[11] 4,197,399

[45] Apr. 8, 1980

[54] PROCESS FOR REMOVING RESIDUAL VINYL CHLORIDE FROM VINYL CHLORIDE POLYMERS IN AQUEOUS DISPERSION

[75] Inventors: Stéphane Noël, Vilvoorde; Jean Golstein; Guillaume Coppens, both of Brussels; Jean-Claude Davoine, Jemeppe-sur-Sambre, all of Belgium

[73] Assignee: Solvay & Cie, Brussels, Belgium

[21] Appl. No.: 596,201

[22] Filed: Jul. 15, 1975

[30] Foreign Application Priority Data

Aug. 14, 1974 [LU] Luxembourg .............................. 70739
Mar. 21, 1975 [LU] Luxembourg .............................. 72112

[51] Int. Cl.² .............................. C08F 6/16; C08F 6/24
[52] U.S. Cl. .............................. 528/500; 260/23 XA; 260/29.6 PT; 528/483
[58] Field of Search .............. 450/774.5; 260/827.5 R, 260/92.8 A, 92.8 W, 29.6 PT; 528/483, 500

[56] References Cited

U.S. PATENT DOCUMENTS

| | | | |
|---|---|---|---|
| 2,068,424 | 1/1937 | Mark et al. | 260/2 |
| 2,373,347 | 4/1945 | Schoenfeld | 260/32 |
| 3,052,663 | 9/1962 | Bodlaender | 260/92.8 |
| 3,956,249 | 5/1976 | Goodman et al. | 528/500 |

FOREIGN PATENT DOCUMENTS 793505  12/1972  Belgium .................................. 528/500

*Primary Examiner*—Stanford M. Levin
*Attorney, Agent, or Firm*—Spencer & Kaye

[57] ABSTRACT

Process for removing the residual vinyl chloride monomer present after polymerisation in vinyl chloride polymers in the form of an aqueous dispersion which is heated to a temperature at least equal to the glass transition temperature of the polymer and subjected to stripping by an inert fluid while being maintained at a temperature at least equal to the glass transition temperature of the polymer.

25 Claims, No Drawings

PROCESS FOR REMOVING RESIDUAL VINYL CHLORIDE FROM VINYL CHLORIDE POLYMERS IN AQUEOUS DISPERSION

The present invention relates to a process for the removal of the residual vinyl chloride present in vinyl chloride polymers that are in the form of aqueous dispersions and for obtaining vinyl chloride polymers having a very substantially reduced residual vinyl chloride content.

Polymerisation in aqueous suspension or emulsion is a polymerisation technique currently used for the production of vinyl chloride polymers. It is currently practice with this technique to stop polymerisation after a degree of conversion of the order of 90–95% has been reached. At higher conversions in the vicinity of 100%, the duration of the polymerisation cycle is greatly extended and there is, moreover, some risk of the polymer degrading.

In spite of the degassing normally carried out at the end of polymerisation to volatilise the unconverted vinyl chloride, the aqueous vinyl chloride polymer dispersions thereby obtained still contain significant quantities of unpolymerised monomer. It is customary to centrifuge the monomer followed by drying of the centrifuged cake, thereby removing a further amount of residual monomer. The dry vinyl chloride polymers thereby obtained nevertheless still contain relatively large quantities of residual vinyl chloride.

Various measures for reducing the residual monomer content present in vinyl polymers have been considered, but have not proved to be very effective.

However, in Belgian Pat. No. 793,505 of 29.12.1972 in the name of Solvay & Cie, an effective process for removing the residual vinyl chloride present in solid vinyl chloride polymers was described, according to which the solid polymer is heated to a temperature between its glass transition temperature and the temperature at which degradation starts by condensing steam directly on to it, the polymer is maintained at this temperature long enough to remove the greater part of the monomer or monomers present in the polymer and the polymer is then cooled to below its glass transition temperature by evaporating the steam which has condensed on the polymer, thereby recovering a dry polymer, free from residual monomer.

This patent does not however mention the possibility of applying the above treatment to a polymer in the form of an aqueous dispersion, particularly an aqueous dispersion as directly obtained on polymerisation.

The Applicants have now found an effective process for removing the residual vinyl chloride from vinyl chloride polymers in aqueous dispersion that makes it possible to treat the aqueous dispersions as directly obtained on polymerisation and prevents the emission of any vinyl chloride to the environment.

The present invention therefore relates to a process for removing the residual vinyl chloride present after polymerisation in vinyl chloride polymers that are in the form of an aqueous dispersion in which the aqueous polymer dispersion is heated to a temperature at least equal to the glass transition temperature of the polymer and subjected to stripping with an inert fluid while maintained at a temperature at least equal to the glass transition temperature of the polymer.

The process according to the present invention can be used with all aqueous dispersions of vinyl chloride polymers, whatever polymerisation process was used, from the moment the polymer is obtained in the form of solid particles. Thus the process according to the invention can be used with vinyl chloride polymers obtained by gas phase or bulk polymerisation. In this case the polymer must first be dispersed in water, which renders the process unattractive from the economic standpoint.

It is consequently preferably to use the process of the present invention for aqueous dispersions obtained directly on polymerisation which may be carried out by the suspension or emulsion processes for example. In this case the aqueous dispersion to which the process of the invention is applied may safely contain the additives habitually present during polymerisation such as residues of initiators (organic or inorganic peroxides or azo derivatives), emulsifying agents (emulsion polymerisation), dispersing agents (suspension polymerisation) etc. These dispersions customarily contain about 5–10 parts by weight of vinyl chloride per 100 parts of polymer. The process of the invention is particularly suitable for treating aqueous dispersions obtained by suspension polymerisation. In point of fact the fineness of the particles and the presence of emulsifying agents in aqueous dispersions obtained from emulsion polymerisation lead to foaming and the carry-over of particles that make it more difficult to use the process of the present invention.

When the process of the invention is applied to aqueous dispersions obtained directly from polymerisation the solids content of the dispersion can be optionally modified beforehand by diluting or concentrating it or its physical state can be modified, eg by coagulation. It is also possible to carrying out a preliminary degassing operation to remove a substantial proportion of the vinyl chloride from the outset.

Degassing is carried out in known manner at the end of polymerisation and before the treatment according to the invention by reducing the pressure, eg to atmospheric pressure, and then subjecting the aqueous polymer dispersion to a partial vacuum. These operations are generally accompanied by a cooling of the dispersion by about 5°–15° C. which is primarily caused by the evaporation of part of the residual vinyl chloride.

The process according to the invention can be used for all vinyl chloride polymers, more particularly those containing more than 50% molar of monomer units derived from vinyl chloride and preferably those containing more than 70% molar of such units. The process is therefore applicable to vinyl chloride homopolymers, random copolymers, graft copolymers and solid compositions containing such polymers. It goes without saying that the process of the invention is equally effective for removing the residues of volatile comonomers that may possibly be present in the aqueous dispersions.

The glass transition temperature of the polymer is advantageously determined by differential thermal analysis which measures the glass transition temperature with reasonable accuracy.

Any desired means can be used for carrying out the first step of the process according to the invention which comprises heating the aqueous polymer dispersion to a temperature above the glass transition temperature: for instance the aqueous dispersion can be heated by circulating a hot fluid through the double jacket of the vessel that contains it and/or by blowing a hot inert fluid such as air, nitrogen or steam directly into it. Steam injection is the preferred method for preheating the aqueous dispersion however. The use of steam enables the desired temperature to be reached in an extremely short time.

The second step in the process according to the invention consists in stripping the residual monomer by means of an inert fluid while the aqueous dispersion is maintained at a temperature at least equal to the glass transition temperature.

The effectiveness of removing the residual monomer is not a function of the nature of the inert stripping fluid. For reasons of convenience such as simplifying the subsequent separation of the vinyl chloride from the stripping fluid it is preferable to carrying out stripping by means of steam. To do this, steam, e.g. superheated steam, may be introduced into the aqueous dispersion by bubbling it through at a rate sufficient to ensure that the liberated vinyl chloride is removed, the desired temperature is maintained and the medium agitated. The steam required for stripping can also be generated by heating the aqueous dispersion to boiling point. Heating can be effected through the walls of the vessel in which the operation is carried out or by any other means.

As with heating during the first step of the treatment, stripping can be effected with inert fluids other than steam, such as inert gases, eg nitrogen and air, or inert vapours such as butane, pentane, hexane, methylene chloride or chloroform. As the aqueous dispersion must be maintained at a temperature at least equal to the glass transition temperature of the polymer it is preferable to use hot inert fluids to compensate for heat losses.

During this second step all or part of the necessary calories can continue to be supplied through the double jacket of the vessel or by any other means.

By inert fluid we mean all fluids in the state of a gas or vapour at the temperature at which stripping is carried out and which are incapable of reacting chemically with the polymer under the operating conditions.

With regard to the temperature of the aqueous dispersion during the stripping step it is essential to maintain it at a value at least equal to the glass transition temperature of the polymer. The upper limit of the temperature at which stripping can be carried out is imposed by the degradation temperature of the polymer. A heat stabiliser may be added if desired.

However, it should be noted that heating to high temperatures, well above 100° C., represents a useless waste of power. Furthermore, the aqueous dispersion treated at a high temperature will subsequently have to be cooled before it can be centrifuged, which will increase the cooling time and/or the volume of cooling liquid required.

For these reasons it is preferable to heat the aqueous dispersion to a temperature not exceeding 140° C. and, preferably, 120° C.

The pressure in the vessel in which stripping of the residual monomer is carried out is regulated as a function of the selected temperature.

It is preferable to operate at the saturation pressure of water under the operating conditions, particularly when steam is used as the inert stripping fluid. This provides a convenient method of regulating the temperature of the aqueous dispersion.

The stripping time is not a critical parameter of the process of the invention either. It is a function not only of the temperature to which the aqueous dispersion is raised but also of its initial residual monomer content, the degree of stripping it is desired to attain and the porosity of the polymer.

Consequently the stripping time can be readily determined experimentally in each individual case. As a guide, a few minutes to about 2 hours and more particularly 5 to 45 minutes are generally sufficient to reduce the residual monomer content of the aqueous vinyl chloride polymer dispersions to a few tens of parts per million expressed in terms of weight with respect to the polymer.

The flow of the stripping fluid is likewise advantageously determined by experimental means in each particular case. It is self-evident that the effectiveness of stripping will increase up to a certain point simultaneously with the increase in the flow of inert fluid leaving the aqueous dispersion. Effectiveness also increases with the temperature as a result of which the use of a relatively high temperature enables the stripping time to be cut down. A temperature range that gives particularly good results in this respect is the range from 90° to 110° C. When operating within this range the stripping time can be reduced to less than 15 minutes while removing practically all the residual vinyl chloride.

The Applicants have also found that the effectiveness of the process according to the invention can be further improved to a significant extent. To achieve this, after heating the aqueous polymer dispersion to a temperature at least equal to the glass transition temperature of the polymer and then subjecting it to stripping with an inert fluid while maintained at a temperature at least equal to the glass transition temperature of the polymer, treatment is completed by lowering the pressure to cause the aqueous dispersion to boil.

The process according to the invention may therefore contain an additional third step comprising steam stripping carried out by means of the steam generated by the boiling of the aqueous dispersion. At the start of the third step the aqueous dispersion is at a temperature at least equal to the glass transition temperature of the polymer. The pressure has been reduced so that it is now below the saturation pressure of the steam at the temperature of the aqueous dispersion. The removal of the vinyl chloride is therefore completed during this step. The third step enables the duration of the preceding step and the heat consumption during that step to be substantially reduced. It is of course possible to continue to apply heat to the aqueous dispersion and to bubble an inert stripping fluid through it while the aqueous dispersion is boiling. It is preferred however for the aqueous dispersion to cool gradually during the third step to a temperature below this glass transition temperature of the polymer. It is for this reason that we prefer to reduce or even completely cut off the supply of external heat to the aqueous dispersion during the third step. Consequently the pressure must be progressively reduced as the aqueous dispersion cools down in order to maintain boiling. The Applicants have found that this method of procedure is particularly effective. Furthermore it shortens the total treatment time by accelerating the cooling of the aqueous dispersion.

The point at which the third treatment step starts is selected as a function of the desired final residual monomer content. It can be readily determined experimentally. The duration of the third step varies as a function of its operating conditions. It is generally between 5 and 45 minutes.

After treatment for the removal of residual monomer the polymer is separated from the aqueous phase. Separation is generally effected in two steps: in the first step the bulk of the water is removed to give a wet cake, e.g.

by filtering or centrifuging, and the polymer is then dried, e.g. by fluidisation. As the equipment for removing a major fraction of the aqueous phase of the dispersion from the polymer (first step) is not usually designed to operate at temperatures close to the glass transition temperature of the polymer, the aqueous dispersion is cooled before removing the major part of the water to a temperature below the glass transition temperature of the polymer, eg between 50° and 80° C. and more particularly to around 70° C., preferably by reducing the pressure as described above. As the polymer is heated during drying there is no economic advantage in going below these temperatures.

Heating the aqueous dispersion and stripping with an inert fluid can be carried out in the polymerisation reactor or in a vessel specially designed for the purpose. Preliminary degassing and final boiling can also be carried out in the same vessel as the process according to the invention if desired. It is preferable to conduct the process in a specially designed vessel provided with a double jacket through which a heating fluid is circulated. It is also advantageous to provide the vessel with a stirring means such as a paddle stirrer.

Whatever vessel is chosen for carrying out the stripping of the residual monomer with a stripping fluid i.e. the polymerisation reactor itself or a vessel specially designed for that purpose, it is particularly advantageous to introduce the inert fluid at the bottom of said treatment vessel, for example through an inlet pipe immersed in the aqueous dispersion or by a "bottom" valve, ensuring an effective bubbling of the stripping fluid through said dispersion.

The process can be carried out continuously or batchwise. As polymerisation is generally conducted batchwise it is preferable for the process according to the invention to be conducted batchwise also.

According to a preferred embodiment of the process of the invention the condensable compounds and particularly the steam present in the gaseous effluent leaving the aqueous dispersion throughout the process is condensed by means of a device positioned upstream of the system for evacuating the gaseous effluent. To achieve this a condenser may be interposed between the vessel in which treatment takes place and the device that maintains the desired pressure within the vessel. In practice the condenser operates at the same pressure as the vessel, disregarding losses of charge. It can however be made to operate at a lower pressure by interposing a valve between the vessel and the condenser. When the treatment does not involve using temperatures above 100° C. the pressure in the treatment vessel is equal to atmospheric pressure at most. A vacuum pump is then used to maintain the desired pressure in the vessel.

When treatment involves phases carried out at a temperature above 100° C. such phases must be conducted under pressure. Nevertheless it is desirable to provide means for creating a vacuum in the vessel, particularly when using the preferred embodiment of the invention that consists in terminating treatment by reducing the pressure to cause the aqueous dispersion to boil.

All types of vacuum pump customarily employed can be used. Ejectors may be used for instance. However, as ejectors consume a large amount of energy it is preferable to use rotary pumps such as liquid ring pumps.

The treatment according to the invention can of course be carried out in installations where a vacuum pump is directly connected to the treatment vessel. In such cases a condenser can be installed downstream of the vacuum pump. However, the Applicants have found that this arrangement has serious drawbacks. If an ejector is used as the vacuum pump the steam consumption of the ejector is prohibitive in view of the large volume of vapour generated by the treatment. Furthermore the total amount of vapour which is extremely large necessitates the use of a very large volume condenser. If a rotary pump is used as the vacuum pump, frequent breakdowns occur accompanied by rapid deterioration of the pump which might be due to the elevated temperature and chemical nature of the discharged vapours.

The Applicants have found that these problems can be readily solved by placing a condenser between the treatment vessel and the vacuum pump. It is preferable to use an exchanger type condenser whose dimensions are such that a very substantial part of the steam leaving the treatment vessel is condensed throughout treatment.

To prevent polymer particles from being carried over into the condenser a foam separator such as a hydrocyclone can be placed between the treatment vessel and the condenser to trap entrained particles which can be recycled to the treatment vessel if desired by means of a stream of water.

The condensed water can be wholly or partly recycled to the aqueous dispersion.

The condensation of the gaseous effluent upstream of the vacuum system makes it possible to use low capacity vacuum pumps of conventional design without incurring frequent breakdowns.

Finally the recycling of the condensed steam to the aqueous dispersion avoids the risk that water still containing traces of vinyl chloride will be discharged to the drains.

The aqueous polymer dispersions obtained at the end of the treatment process contain virtually no residual vinyl chloride. Furthermore the monomer stripped from the aqueous dispersions can be readily recovered simply by condensing the steam.

The process of the present invention therefore provides a number of significant advantages, namely the production of vinyl chloride polymers with a minute residual monomer content, the simple and economic recovery of the stripped residual monomer and a very appreciable reduction in the amount of monomer discharged to the atmosphere and the surface water.

The Applicants have also found, contrary to what might have been feared, that the treatment of aqueous polyvinyl chloride suspensions by the process of the present invention causes no degradation whatsoever of the said polymers. On the contrary the vinyl chloride polymers possess notably improved initial heat stability after treatment and their long term heat stability is in no way affected by the treatment according to the process of the invention.

Briefly, the process according to the invention permits the remarkably effective removal not only of the vinyl chloride on the exterior of the polymer particles but also the vinyl chloride occluded in their interior. If the operating conditions are correctly chosen, the dried polymer contains less than 2 ppm of residual vinyl chloride which makes it suitable for use in the production of foodstuffs containers such as bottles.

The following examples illustrate the invention without, however, limiting it.

Examples 1, 2, $R_3$, $R_4$ and 7 used an aqueous dispersion of polyvinyl chloride obtained by polymerising vinyl chloride in an aqueous suspension at 70° C. with degassing at 60° C. under partial vacuum (absolute residual pressure 350 mm Hg).

This polyvinyl chloride has the following characteristics:
glass transition temperature:88.5° C.
porosity (by absorption of dioctyl phthalate):11%
packing density:0.66 kg/dm$^3$ Examples 5 and R$_6$ used in aqueous dispersion of polyvinyl chloride obtained by polymerising vinyl chloride in an aqueous suspension at 60° C., with degassing at 55° C. under partial vacuum (absolute residual pressure 350 mm Hg).

This polyvinyl chloride has the following characteristics:
glass transition temperature:89° C.
porosity (by absorption of dioctyl phthalate):21%
packing density:0.55 kg/dm$^3$

EXAMPLE 1

10 liters of aqueous suspension are introduced with stirring into a 16 liter vessel connected to a vacuum pump and fitted with a double jacket, a stirrer and a steam inlet pipe immersed in the vessel. After evacuating to obtain an absolute residual pressure of 526 mm Hg, super-heated steam at 152° C. (rate of flow: 4 kg/hour) is introduced into the aqueous dispersion through the immersed inlet pipe. The aqueous dispersion, which was initially at about 60° C., heats up rapidly in contact with the steam which condenses on it. When the aqueous dispersion has reached a temperature of 90° C., ie the temperature corresponding to the dew point of the steam under the operating pressure, the steam practically ceases to condense and is removed directly by the evacuating system, taking with it the residual vinyl chloride. The blowing of the superheated steam into the aqueous dispersion is continued so as to maintain its temperature at 90° C. for 30 minutes (rate of flow: 1 kg/hour). At the end of this time the steam inlet and the vacuum pump are cut off and cold water is circulated through the double jacket to cool the suspension to 70° C.

The steam and the vinyl chloride removed with it are separated by condensation of the steam.

The initial and final vinyl chloride contents of the aqueous suspensions are shown in the attached table.

The cooled aqueous suspension is centrifuged and the cake dried for 2 hours at 65° C. The vinyl chloride content of the dry polyvinyl chloride is also shown in the table.

The heat stability is determined on a composition prepared as follows: 20 g dioctyl phthalate, 1.2 g of a barium-cadmium stabiliser and 1 g stearic acid are added to 100 g of dry resin.

After mixing the composition on rolls for 2 minutes at 175° C., a scarcely coloured (very pale pink) crêpe is obtained.

EXAMPLE 2

This example is identical to the previous example except that steam stripping is carried out for 15 minutes at 100° C.

In this case too the initial colour of the crêpe is very pale pink.

The operating conditions and the results are shown in the attached table.

EXAMPLE R$_3$

This example, given as a control, relates to the treatment of an aqueous suspension of polyvinyl chloride identical to that used in Example 1, the said treatment being carried out at 80° C., ie at a temperature lower than the glass transition temperature of the polymer.

The operating conditions and the results are shown in the attached table.

EXAMPLE R$_4$

This example, also given as a control, relates to the conventional treatment of an aqueous suspension of polyvinyl chloride identical to that used in Example 1, ie in the sequence: degassing, centrifuging and drying (2 hours at 65° C.).

The operating conditions and the results are shown in the attached table.

In this case the initial colour of a crêpe produced under identical conditions to those described in Example 1 is deep pink.

EXAMPLE 5

This example is identical to Example 1, but the duration is limited to 15 minutes. In addition, the cake is dried for 2 hours at 70° C.

The operating conditions and the results are shown in the attached table.

The initial colour of a crêpe produced under identical conditions to those of Example 1 is very pale pink.

EXAMPLE R$_6$

This example, given as a control, relates to the conventional treatment of an aqueous suspension of polyvinyl chloride identical to that used in Example 5.

In this example the degassed aqueous suspension is centrifuged, then dried for 2 hours at 70° C.

The initial colour of a crêpe produced under identical conditions to those of Example 1 is deep pink.

EXAMPLE 7

This example illustrates the completion of the stripping of residual monomer by steam generated solely by the boiling of the aqueous suspension and the use of a condenser.

10 liters of degassed aqueous suspension are introduced with stirring and after the prior creation of a vacuum to obtain an absolute residual pressure of 526 mm Hg into a 16 liter vessel connected to a vacuum pump via a water cooled heat exchanger type condenser with a heat exchange surface area of 400 cm$^2$ and provided with a stirrer and a steam inlet pipe immersed in the vessel. Superheated steam at 152° C. is then introduced via the immersed inlet pipe (rate of flow: 4 kg/hour). The dispersion which was initially at about 60° C. heats up rapidly on contact with the steam which condenses thereon. No cooling water circulates in the condenser during this heating step. When the aqueous dispersion has reached a temperature of 90° C., ie the temperature that corresponds to the dew point of the steam under the operating pressure, the steam virtually ceases to condense and steam stripping starts. From this point onwards the flow of steam injected is reduced to 1 kg/hour and the condenser is started up while regulating the flow of gaseous effluent sucked in to maintain the temperature constant for 20 minutes. At the end of this period and after taking a sample of the aqueous suspension, the supply of superheated steam is cut off and the vacuum pump is kept running while operating the condenser at maximum capacity. The aqueous dispersion is thus kept at boiling point at a decreasing temperature for 10 minutes. At the end of this period its temperature is 70° C. A second sample of the aqueous suspension is taken at this point.

Analysis of the sample of aqueous suspension taken at the end of the constant temperature (90° C.) steam stripping operation revealed that at this point the aqueous suspension still contained 250 mg of vinyl chloride per kg of polyvinyl chloride.

Analysis of the second sample taken after steam stripping for 20 minutes at a decreasing temperature revealed that the vinyl chloride content had been reduced to 50 mg per kg of polyvinyl chloride.

The initial colour of a crêpe produced under the conditions described in Example 1 is very pale pink.

A comparison of Examples 1, 2 and 5 with the control Examples $R_3$, $R_4$ and $R_6$ adequately demonstrates the efficiency with which the residual vinyl chloride is removed by the process of the present invention both from the aqueous dispersion and the dry polymer.

A comparison of Examples 1 and 7 shows that the completion of the treatment of the aqueous suspension by stripping with steam generated exclusively in situ enables excellent results to be obtained with a lower steam consumption and an overall increase in productivity.

EXAMPLE 8

This example relates to the treatment of an aqueous emulsion containing an ammonium salt of a fatty acid as emulsifying agent.

The aqueous emulsion is obtained by polymerising vinyl chloride in aqueous emulsion at 70° C. in the presence of ammonium stearate with degassing at 60° C. under a partial vacuum (absolute residual pressure 350 mm Hg). It takes the form of a stable emulsion with elementary particles 0.1 micron in diameter.

The initial vinyl chloride content of the degassed aqueous emulsion is 7 g/kg PVC. The polyvinyl chloride has a glass transition temperature of 88.5° C.

The degassed aqueous emulsion is treated as in Example 1 except that stripping is carried out at 95° C. under a residual pressure of 634 mm Hg for 15 minutes and ammonia (10% aqueous solution) is injected into the emulsion during stripping in amounts that are sufficient to maintain the pH of the aqueous emulsion constant at its initial value. This procedure avoids (or may possibly compensate for) the destruction of the emulsifying agent.

After treatment for 15 minutes the vinyl chloride content of the aqueous emulsion is less than 2 mg per kg of polyvinyl chloride. The emulsion has retained its stability.

We claim:

1. In a process for removing the residual vinyl chloride monomer present after polymerization in vinyl chloride polymer by heating the polymer to a temperature at least equal to the glass transition temperature of the polymer, and subjecting the polymer to stripping by an inert fluid while maintaining the polymer at a temperature at least equal to the glass transition temperature of the polymer, the improvement comprising, prior to separating the polymer from an aqueous dispersion which is formed during the polymerization, heating and subjecting to stripping the vinyl chloride polymer in the form of said aqueous dispersion obtained directly from polymerization.

2. Process as in claim 1, wherein the aqueous polymer dispersion is heated to a temperature below 140° C.

3. Process as in claim 1, wherein the aqueous polymer dispersion is heated to a temperature below 120° C.

4. Process as in claim 1, wherein polymer dispersion is degassed before being heated.

5. Process as in claim 4, wherein the aqueous polymer dispersion is degassed at a temperature below the polymerisation temperature.

6. Process as in claim 1, wherein the inert fluid is steam.

7. Process as in claim 6 wherein steam stripping is carried out by means of steam generated by boiling the aqueous dispersion.

8. Process as in claim 1, wherein when the aqueous dispersion has been subjected to stripping by the inert fluid it is caused to boil by reducing the pressure.

9. Process in claim 8, wherein the aqueous dispersion is allowed to cool after stripping at the temperature at least equal to the glass transition temperature of the polymer; and the pressure is progressively reduced, as the temperature of the aqueous dispersion decreases, so as to maintain boiling without the application of calories from outside.

10. Process as in claim 8, wherein the boiling is terminated when the temperature of the aqueous dispersion has reached a value below the glass transition temperature of the polymer.

11. Process as in claim 8, wherein the boiling is terminated when the temperature of the aqueous dispersion has reached a value of between 50° and 80° C.

12. Process as in claim 6, wherein the steam leaving the aqueous dispersion is condensed.

13. Process as in claim 12, wherein the stripping is conducted in a vessel and the steam is condensed in a condenser connected to the vessel and to a vacuum pump directly connected therewith.

Table

| Example No. | Initial VC* content of the suspension g, kg PVC | Heat treatment conditons for the aqueous suspension | | | | Final VC content of suspension mg/kg PVC | Final VC content of dried polymer mg/kg |
|---|---|---|---|---|---|---|---|
| | | Steam temperature °C. | Suspension temperature °C. | Pressure mm Hga | Time** min | | |
| 1 | 6.1 | 152 | 90 | 526 | 30 | 70 | ≦2 |
| 2 | 6.1 | 152 | 100 | 760 | 15 | 25 | ≦2 |
| $R_3$ | 6.1 | 152 | 80 | 355 | 30 | 780 | 200 |
| $R_4$ | 6.1 | — | — | — | — | — | 790 |
| 5 | 13.2 | 152 | 90 | 526 | 15 | ≦2 | ≦2 |
| $R_6$ | 13.2 | — | — | — | — | — | 200 |

*VC : vinyl chloride
PVC : polyvinyl chloride
**time : counted from the moment when the aqueous suspension reaches the selected temperature 14. Process as in claim 13, wherein part of the condensed water is recycled to the vessel.

15. Process as in claim 1, wherein the stripping with an inert fluid is carried out in the polymerisation reactor.

16. Process as in claim 1, wherein the stripping with an inert fluid is carried out in a vessel other than the polymerization reactor.

17. Process as in claim 15, wherein the stripping fluid is introduced at the bottom of the polymerisation reactor.

18. Process as in claim 1, wherein residual monomer is removed from vinyl chloride polymers obtained by polymerisation in aqueous suspension.

19. Process as in claim 1, wherein vinyl chloride is removed from a vinyl chloride homopolymer.

20. Process as in claim 9 wherein the boiling is terminated when the temperature of the aqueous dispersion has reached a value below the glass transition temperature of the polymer.

21. Process as in claim 9 wherein the boiling is terminated when the temperature of the aqueous dispersion has reached a value of between 50° and 80° C.

22. Process as in claim 8 wherein the steam leaving the aqueous dispersion is condensed.

23. Process as in claim 22, wherein the stripping is conducted in a vessel and the steam is condensed in a condenser connected to the vessel and to a vacuum pump directly connected therewith.

24. Process as in claim 23, wherein part of the condensed water is recycled to the vessel.

25. Process as in claim 16 wherein the stripping fluid is introduced at the bottom of the vessel.

* * * * *